United States Patent Office 3,483,162
Patented Dec. 9, 1969

3,483,162
PHOTOCHROMIC SCHIFF BASE COPOLYMERS
Joseph E. Kovacic, St. Paul, Minn., assignor to Sperry Rand Corporation, New York, N.Y., a corporation of Delaware
No Drawing. Filed Apr. 25, 1967, Ser. No. 633,423
Int. Cl. C08f 33/02, 29/46; C09k 1/00
U.S. Cl. 260—47                                     10 Claims

ABSTRACT OF THE DISCLOSURE

Photochromic Schiff base copolymers are prepared by copolymerizing a photochromic Schiff base which is substituted with an unsaturated hydrocarbon group with an unsaturated monomer, such as styrene and methyl methacrylate. The resulting photochromic copolymer material can then be converted to thin film material for use in displays and/or memory systems. Examples of photochromic Schiff bases substituted with an unsaturated hydrocarbon group which are useful in the preparation of the above-identified photochromic copolymer materials include 3-allylsalicylidene aniline,
3-allylsalicylidene-2',4'-dimethyl-aniline,
3-allylsalicylidene-o-chloroaniline,
3-allylsalicylidene-o-iodoaniline,
3-allylsalicylidene-2',4'-dichloroaniline,
3-allylsalicylidene-2',4'-dibromoaniline,
3-allylsalicylidene-3',4',5'-trichloroaniline and
3-allylsalicylidene-2',4',6'-trichloroaniline.

BACKGROUND OF THE INVENTION

Many of the Schiff bases, the reaction product of an aldehyde with a primary amine, prepared by reacting salicylaldehyde and substituted salicylaldehydes with anilines are known to be photochromic. Photochromism is the term employed to describe the phenomenon of a change in the color of a material which occurs on exposure to ultraviolet (U.V.) radiation, followed by return to the original color on exposure to radiation, usually visible, of a different wave length or on storage in the dark. Most of the known salicylidene anilines are colored some shade of yellow in the ground state but when exposed to ultraviolet radiation the photochromic salicylidene anilines become colored orange to red. In the dark this color is retained for varying periods of time. However, the colored or excited state can be returned to the ground state color very quickly by exposure to intense visible radiation.

In computer memory systems or displays it would appear that photochromic materials would be more advantageously employed in the form of a film rather than as crystalline aggregates. Various film forming materials are known which contain dispersed or dissolved photochromic materials in a plastic which has very nearly the same refractive index as the photochromic material itself. Compounds employed in such products, e.g. the spiropyrans, however, have the tendency to "fatigue" after a number of exposures to ultraviolet radiation, followed by exposure to visible radiation. Fatigue appears to be associated with an irreversible reaction upon exposure to ultraviolet radiation energy.

Therefore, it is an object of this invention to produce a material which is not only capable of being cast or produced or otherwise fabricated into film-form but which is also photochromic per se.

Another object of this invention is to convert a known photochromic material, such as a photochromic salicylidene aniline, to a material which is capable of being formed or fabricated into a film but which also in the film-form exhibits photochromic properties.

SUMMARY OF THE INVENTION

It has been discovered that photochromic Schiff bases when substituted with an unsaturated hydrocarbon group, such as in the salicylidene portion of a Schiff base derived by reacting a salicylaldehyde with a primary amine, and then copolymerized with an unsaturated monomer, such as styrene and methyl methacrylate, produce photochromic copolymer materials which can be converted to thin film materials suitable for use in computer display and/or memory systems. Specifically, and in accordance with one embodiment of this invention, it has been discovered that a copolymer of methyl methacrylate and 3 - allylsalicylidene - 3',4',5' - trichloroaniline is not only photochromic at room temperature but is also capable of being converted to a thin film material.

A Schiff base is the reaction product of an aldehyde with a primary amine. Many of the Schiff bases prepared by reacting salicylaldehyde and substituted salicylaldehydes with aniline and substituted anilines are known to be photochromic. If such Schiff bases are substituted with an unsaturated short chain hydrocarbon group on one of the rings the resulting material could then readily be copolymerized with unsaturated monomers, e.g., vinyl monomers, such as methyl methacrylate and styrene. The resulting copolymer would retain the photochromic structure of the unsaturated hydrocarbon substituted Schiff base intact. For example, a commercially available material 3-allysalicylaldehyde having the structural formula (I) 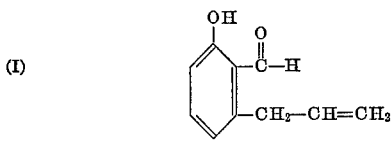

could be reacted with a substituted aniline, such as a substituted aniline having the formula (II) 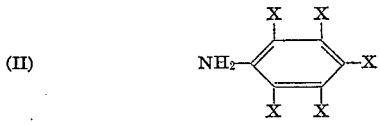

wherein X is H, F, Cl, Br, I CH₃, or combinations thereof, to yield a Schiff base. In the instance where the substituted aniline is 2,4,6-trichloroaniline, there would be produced the Schiff base 3-allysalicylidene-2',4',6'-trichloroaniline having the structural formula:

(III) 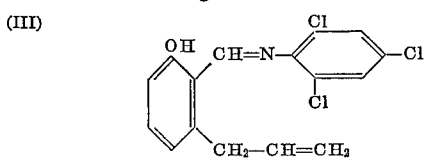

The resulting unsaturated hydrocarbon substituted Schiff base, 3-allylsalicylidene - 2',4',6'-trichloroaniline although extremely difficult to polymerize alone can be readily polymerized with a vinyl monomer, such as methyl methacrylate or styrene to yield, in the case of styrene, the photochromic copolymer having the structural formula (IV)

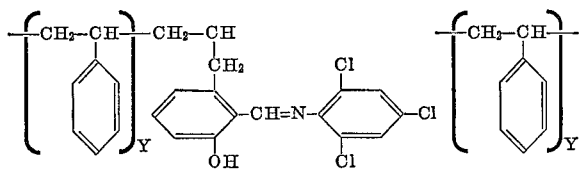

wherein Y is an integer greater than one, usually in the range 5–100, more or less. As appears from the structural formula of the above illustrative photochromic copolymer prepared in accordance with this invention, the basic, photochromic structure of the salicylidene aniline component remains intact and, accordingly, retains its photochromic properties and imparts its photochromic properties to the resulting copolymer.

The allylsalicylidene anilines employed in accordance with the practice of this invention for reaction or copolymerization with an unsaturated monomer, such as styrene and methyl methacrylate, were prepared by reacting 3-allylsalicylaldehyde with aniline or a substituted aniline either in the presence of absence of a solvent. The following examples are illustrative of the preparation of allylsalicylidene anilines:

Example 1

3-allylsalicylidene aniline.—Equimolar amounts of 3-allylsalicylaldehyde and aniline in methanol were heated at reflux for 30 minutes and allowed to cool. A small sample was evaporated to remove methanol and the liquid residue tested tested by means of an infrared spectrophotometer. The infra-red spectrum indicated that reaction was complete. The methanol was evaporated from the remaining reaction mixture and an orange-yellow oil remained which could not be crystallized. The product was not photochromic at room temperature but was fluorescent at liquid nitrogen temperature. When copolymerized with styrene or methyl methacrylate, a copolymer resulted which was fluorescent and photochromic at the temperature of liquid nitrogen.

Example 2

3-allylsalicylidene-2′,4′-dimethylaniline.—4.866 g. (0.03 mol) of 3-allylsalicylaldehyde was dissolved in 25 ml. of ethanol. Separately 3.64 g. (0.03 mol) of 2,4-dimethylaniline was dissolved in 25 ml. of ethanol. The two solutions were combined and heated to reflux for 30 minutes. The reaction mixture was colored orange-yellow after heating. Approximately half of the ethanol was removed by evaporation and the resulting solution cooled in a freezer overnight. Long yellow needles of product formed which were filtered off and dried. The infra-red spectrum of a Nujol mull supported the structure shown below:

(V)

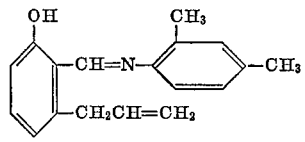

Approximately 2% solutions of (V) in styrene and methyl methacrylate were copolymerized thermally. In addition, a 2-component potting material which is a catalyzed acrylate system was used as the matrix for copolymerization tests. The resulting copolymers were photochromic and fluorescent at the temperature of liquid nitrogen.

Example 3

3-allylsalicylidene-o-chloroaniline.—A solution of 1.622 g. (0.01 mol) of o-chloroaniline was heated at 60° C. for three hours in 10 ml. of ethanol. At the end of this time, an infra-red scan indicated that very little reaction had occurred. Therefore, the ethyl alcohol was evaporated and the residue heated at 100–125° C. for one hour. An infra-red scan then indicated that the reaction was completed. The product was a yellow oil. When the product was copolymerized with styrene and with methyl methacrylate the resulting copolymers were found to be photochromic and fluorescent at the temperature of liquid nitrogen.

Example 4

3-allylsalicylidene-o-iodoaniline.—A solution of 1.622 g. (0.01 mol) of 3-allylsalicylaldehyde and 2.19 g. (0.01 mol) of o-iodoaniline in 15 mol. of ethanol was heated to reflux for 30 minutes. No color change occurred indicating that no reaction had taken place. The ethanol was evaporated and the residue heated for 30 minutes at 125° C. at which time the infra-red spectrum showed that the reaction was completed. The product was a reddish-orange oil which could not be crystallized. When the product was copolymerized with styrene and with methyl methacrylate the resulting copolymers were found to be photochromic and fluorescent at the temperature of liquid nitrogen.

Example 5

3-allylsalicylidene-2′,4′-dichloroaniline.—A mixture of 1.622 g. (0.01 mol) of 3-allylsalicylaldehyde and 1.62 g. (0.01 mol) of 2,4-dichloroaniline was heated on a hot plate in a beaker until an infra-red spectrum showed that the reaction was completed. The product was recrystallized from petroleum ether (30–70° C.) to obtain bright yellow needles. This Schiff base is photochromic under U.V. excitation. When the product was copolymerized with styrene and with methyl methacrylate the resulting copolymers were found to be photochromic and fluorescent at the temperature of liquid nitrogen.

Example 6

3-allylsalicylidene-2′,4′-dibromoaniline.—Following the procedure of Example 5, 0.01 mol of 2,4-dibromoaniline was reacted with 0.01 mol of 3-allylsalicylaldehyde. After recrystallization from petroleum ether, the product was recovered as bright orange-yellow crystals. This Schiff base was also photochromic under U.V. excitation. When the product was copolymerized with styrene and with methyl methacrylate the resulting copolymers were found to be photochromic and fluorescent at the temperature of liquid nitrogen.

Example 7

3-allylsalicylidene - 3′,4′,5′ - trichloroaniline.—Equimolar amounts of 3-allylsalicylaldehyde and 3,4,5-trichloroaniline were heated and reacted until an IR scan indicated that the reaction was completed. On cooling, the product formed a crystalline mass which was recrystallized twice from isopropanol to give orange-yellow large needles of the product. When the product was copolymerized with styrene and with methyl methacrylate the resulting copolymers were found to be photochromic at room temperature.

Example 8

3 - allylsalicylidene - 2′, 4′, 6′ - trichloroaniline.—3.244 g. (0.02 mol) 3-allylsalicylaldehyde, 3.93 (0.02 mol) of 2,4,5-trichloroaniline and 40 ml. of n-amyl alcohol were heated to reflux (ca. 135° C.) for a total of 72 hours. A sample was removed, evaporated and the residue tested about every 12 hours during the heating period in order to determine when the reaction was completed. At the end of 72 hours, the reaction was not yet completed, but heat was discontinued and the n-amyl evaporated. Twenty ml. of petroleum ether (30–70° C.) were added to the oily residue and the solution placed in a freezer overnight. An infra-red spectrum of the precipitated crystalline showed it to be contaminated with starting material. It was therefore recrystallized two additional times and the contaminants were thereby removed. The compound was found to be photochromic under U.V. radiation. When the product was copolymerized with styrene and with methyl methacrylate the resulting copolymers were found to be photochromic at the temperature of liquid nitrogen.

Example 9

Substituted allylsalicylidene anilines were copolymerized with styrene and with methyl methacrylate by heating in the absence of a catalyst. Additionally, a 2-component methacrylate potting compound was used as a potting matrix. All the copolymers were found to be photochromic at liquid nitrogen temperatures. In addition, any of the copolymers were found to be fluorescent. The complete results of these tests are set forth in accompanying Table I:

carbon atoms, vinyl esters, such as vinyl acetate and vinyl propionate, the vinyl and vinylidene chlorides, styrene-butadiene mixtures, styrene-butadiene-acrylonitrile mixtures, ethylene, propylene and ethylene-propylene systems, acrylonitrile, acrylamide, N-vinyl pyrrolidone, methyl vinyl ketone, methyl isopropenyl ketone, ethyl vinyl sulfone, butyl vinyl sulfone, methacrylonitrile, vinylene carbonate, α-methylstyrene, vinyl toluene, N-vinyl carbazole, vinyl ethers 4-phenylbutene-1, acrylonitrile-isopropenyl toluene systems, vinyl chloride-vinyl acetate systems, vinyl chloride-vinylidene chloride systems and mixtures of the foregoing.

The copolymerization of the substituted Schiff base with the unsaturated monomer in accordance with this invention may be carried out using any of the catalytic or non-catalytic polymerization techniques. The unsaturated grouping may be located at substantially any position in the substituted Schiff base, either in the salicylaldehyde portion or in the anilene ring portion of the Schiff base, the only requirement being that the substituted Schiff base be capable of polymerization, thermally

TABLE I

| Compound | Physical state | UV exposure of pure compound | UV exposure of copolymers [1] |
|---|---|---|---|
| 3-allylsalicylidene aniline | Liquid | No effect | Fluorescent and photochromic at liquid N₂ temperature. |
| 3-allylsalicylidene-o-chloroaniline | do | do | Do. |
| 3-allylsalicylidene-o-iodoaniline | do | do | Do. |
| 3-allylsalicylidene-2',4'-dimethylaniline | Solid | Photochromic | Do. |
| 3-allylsalicylidene-3'4',5'-trichloroaniline | do | do | Photochromic at room temperature. |
| 3-allylsalicylidene-3',4',6'-trichloroaniline | do | do | Photochromic at liquid N₂ temperature. |

[1] In methyl methacrylate, in a mixture of styrene and methyl methacrylate, and in a 2-component potting compound (a catalyzed acrylate system).

Example 10

3-allylsalicylidene - 3',4',5' - trichloroaniline was copolymerized with methyl methacrylate at a temperature of about 40–50° C. employing 2,2'-azobis(2-methylpropionitrile) as a catalyst. The resulting copolymer was found to be photochromic at room temperature and to be strongly photochromic and fluorescent at liquid nitrogen temperature.

The unsaturated hydrocarbon group, e.g. a group containing the C=C or C≡C linkage, substituted on the Schiff bases employed in the practices of this invention for the polymerization with an unsaturated monomer are characterized by containing in the hydrocarbon group or chain an unsaturated linkage, such as the ethylene group (—CH=CH₂) or the allyl group (—CH₂—CH=CH₂)

Although the allyl group as the substituent unsaturated short hydrocarbon has been found particularly satisfactory as the unsaturated substituent hydrocarbon group, other unsaturated, relatively short chains, e.g. containing from 2 to 7 carbon atoms per group, are useful.

The unsaturated monomers particularly useful in accordance with this invention for copolymerization with the Schiff bases in accordance with this invention include styrene and the various acrylates, particularly the methacrylates, such as the alkyl acrylates and the alkyl methacrylates, e.g., methyl methacrylate, ethyl methacrylate, propyl methacrylate, butyl methacrylate and the like. Other unsaturated monomers which are useful in the preparation of photochromic copolymers in accordance with this invention include the acrylate and methacrylate esters having the structures

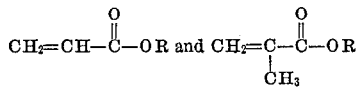

wherein R is an alkyl, aryl or aralkyl group, the alkyl group or moiety preferably containing not more than 6 or catalytically, by addition with the unsaturated monomer.

In carrying out the copolymerization of the substituted Schiff base with the unsaturated monomer the reaction ratios are usually in the range such that the Schiff base comprises less than about 10% of the reactants, with the remainder being the unsaturated monomer. The preferred amount of the Schiff base is in the range 1–5% by weight since it appears that when the Schiff base comprises more than 10% of the reactants the properties of the resulting copolymer are adversely affected.

The copolymer produced in accordance with this invention can be converted into film-form by hot pressing, by dissolution in a solvent followed by evaporation of the solvent or by carrying out the copolymerization of the reactants between suitable substrate surfaces, such as glass plates, to produce directly a thin film of the copolymer. The potting compound employed in the tests demonstrative and illustrative of this invention is simply a 2-component mixture containing a catalyst and powdered acrylate or methacrylate ester as one component and a monomeric acrylate or methacrylate ester as the other component. When these materials are mixed the resulting material or product is a hard acrylate polymer and its purpose in the practice of this invention is to serve as a suitable or convenient polymerization system.

As will be apparent to those skilled in the art in the light of the foregoing disclosure, many substitutions, alterations and modifications may be made in the practice of this invention without departing from the spirit or scope thereof.

I claim:

1. A photochromic addition copolymer derived by reacting an unsaturated monomer and a salicylidene aniline containing a substituent unsaturated hydrocarbon group, the salicylidene aniline comprising less than about 10% by weight of the reactants employed in producing said photochromic copolymer.

2. A copolymer in accordance with claim 1 wherein said unsaturated monomer is selected from the group consisting of styrene and an acrylate.

3. A copolymer in accordance with claim 1 wherein said salicylidene aniline is 3-allylsalicylidene aniline.

4. A copolymer in accordance with claim 1 wherein said salicylidene aniline is 3-allylsalicylidene-2′,4′-dimethylaniline.

5. A copolymer in accordance with claim 1 wherein said salicylidene aniline is 3-allysalicylidene-o-chloroaniline.

6. A copolymer in accordance with claim 1 wherein said salicylidene aniline is 3-allylsalicylidene-o-iodoaniline.

7. A copolymer in accordance with claim 1 wherein said salicylidene aniline is 3-allylsalicylidene-2′,4′-dichloroaniline.

8. A copolymer in accordance with claim 1 wherein said salicylidene aniline is 3-allylsalicylidene-2′,4′-dibromoaniline.

9. A copolymer in accordance with claim 1 wherein said salicylidene aniline is 3-allylsalicylidene-3′,4′,5′-trichloraniline.

10. A copolymer in accordance with claim 1 wherein said salicylidene aniline is 3-allylsalicylidene-2′,4′,6′-trichloroaniline.

References Cited

UNITED STATES PATENTS

| 3,141,903 | 7/1964 | Fertig et al. |
| 3,186,968 | 6/1965 | Fertig et al. |
| 3,190,860 | 6/1965 | Fertig et al. |
| 3,290,270 | 12/1966 | Goldberg et al. |

HARRY WONG, JR., Primary Examiner

U.S. Cl. X.R.

96—90; 117—124; 204—159.14; 260—63, 79.3, 80.3, 80.73, 80.77, 80.78, 82.3, 85.5, 85.7, 86.1, 87.5, 87.7, 88.1, 566

FO-1050
(5/69)

UNITED STATES PATENT OFFICE
CERTIFICATE OF CORRECTION

Patent No. 3,483,162            Dated December 9, 1969

Inventor(s)     JOSEPH E. KOVACIC

It is certified that error appears in the above-identified patent and that said Letters Patent are hereby corrected as shown below:

In column 3, line 29, the word "of" (first occurrence) should correctly read -- or --; line 39, the second "tested" should be removed.

In column 4, line 3, the phrase -- 3-allylsalicylaldehyde and 1.27 g. (0.01 mol) of -- should be inserted after "of"; last line, "heat" should read -- heating --; last line, after "n-amyl the word -- alcohol -- should be inserted.

In column 5, line 3, after "crystalline" the word -- product -- should be inserted; line 19, "any" should read -- many --; under Table I, the last compound listed should correctly read -- 3-all salicylidene-2',4',6'-trichloroaniline --.

SIGNED AND
SEALED
JUL 14 1970

(SEAL)
Attest:

Edward M. Fletcher, Jr.
Attesting Officer

WILLIAM E. SCHUYLER, JR.
Commissioner of Patents